United States Patent
Il et al.

(10) Patent No.: US 10,550,278 B2
(45) Date of Patent: Feb. 4, 2020

(54) WATER-BASED INK FOR INK-JET RECORDING

(71) Applicant: KAO CORPORATION, Tokyo (JP)

(72) Inventors: Tomoaki Il, Wakayama (JP); Masayuki Narita, Ichikawa (JP); Kazuki Watanabe, Wakayama (JP)

(73) Assignee: KAO CORPORATION, Tokyo (JP)

(*) Notice: Subject to any disclaimer, the term of this patent is extended or adjusted under 35 U.S.C. 154(b) by 22 days.

(21) Appl. No.: 15/752,708

(22) PCT Filed: Aug. 12, 2016

(86) PCT No.: PCT/JP2016/073803
§ 371 (c)(1),
(2) Date: Feb. 14, 2018

(87) PCT Pub. No.: WO2017/030100
PCT Pub. Date: Feb. 23, 2017

(65) Prior Publication Data
US 2018/0215935 A1 Aug. 2, 2018

(30) Foreign Application Priority Data
Aug. 18, 2015 (JP) ................... 2015-160997

(51) Int. Cl.
*C09D 11/00* (2014.01)
*C09D 11/322* (2014.01)
*C09D 11/38* (2014.01)

(52) U.S. Cl.
CPC ............ *C09D 11/322* (2013.01); *C09D 11/38* (2013.01)

(58) Field of Classification Search
CPC ..... C09D 11/322; C09D 11/326; C09D 11/38; C09D 11/00; B41J 2/01; B41M 5/0023
USPC ........................................... 523/160
See application file for complete search history.

(56) References Cited

U.S. PATENT DOCUMENTS

| 5,637,140 | A | * | 6/1997 | Fujioka | .................. | C09D 11/30 |
| | | | | | | 106/31.35 |
| 8,784,549 | B2 | * | 7/2014 | Bermel | ................ | C09D 11/322 |
| | | | | | | 106/31.6 |
| 2008/0314292 | A1 | | 12/2008 | Shimanaka et al. | | |
| 2009/0130312 | A1 | * | 5/2009 | Ono | ....................... | B41M 5/506 |
| | | | | | | 427/288 |
| 2015/0291718 | A1 | | 10/2015 | Shimanaka et al. | | |
| 2017/0362358 | A1 | | 12/2017 | Ozaki et al. | | |
| 2018/0311968 | A1 | * | 11/2018 | Sato | ......................... | B41J 2/01 |

FOREIGN PATENT DOCUMENTS

| JP | 60-123564 | A | 7/1985 |
| JP | 2009-024165 | A | 2/2009 |
| JP | 2011-121344 | A | 6/2011 |
| JP | 2013-082885 | A | 5/2013 |
| JP | 2013-091734 | A | 5/2013 |
| JP | 2014-210837 | A | 11/2014 |
| JP | 2015-108063 | A | 6/2015 |
| WO | WO 2014/091923 | A1 | 6/2014 |
| WO | WO 2016/104260 | A1 | 6/2016 |

OTHER PUBLICATIONS

Machine Translation of JP 2013-091734 (Year: 2013).*
Extended European Search Report for corresponding European Application No. 16837090.6, dated Feb. 20, 2019.
International Search Report (PCT/ISA/210) issued in PCT/JP2016/073803, dated Nov. 8, 2016.

* cited by examiner

*Primary Examiner* — Hannah J Pak
(74) *Attorney, Agent, or Firm* — Birch, Stewart, Kolasch & Birch, LLP

(57) ABSTRACT

The present invention relates to [1] a water-based ink for ink-jet printing containing titanium oxide (A) and a pigment dispersant (B), in which the pigment dispersant (B) contains a constitutional unit derived from an anionic group-containing monomer (a) and a constitutional unit derived from a polyalkylene glycol (meth)acrylate (b); an average molar number of addition of an alkyleneoxide in the polyalkylene glycol (meth)acrylate (b) is from 15 to 100; an acid value of the pigment dispersant (B) is from 100 to 400 mgKOH/g; and a content of the pigment dispersant (B) in the water-based ink is from 0.3 to 18 parts by mass on the basis of 100 parts by mass of the titanium oxide (A), and [2] an ink-jet printing method of ejecting the water-based ink described in the above item [1] onto a printing medium using an ink-jet printing apparatus to print characters or images on the printing medium. According to the present invention, there are provided a water-based ink for ink-jet printing which contains titanium oxide as a pigment, and is excellent in redispersibility, and an ink-jet printing method.

18 Claims, 1 Drawing Sheet

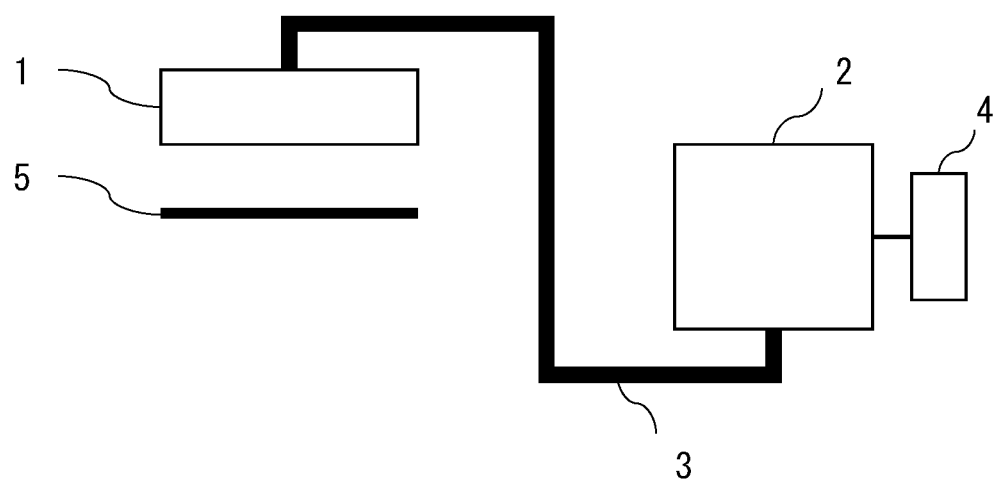

WATER-BASED INK FOR INK-JET RECORDING

FIELD OF THE INVENTION

The present invention relates to a water-based ink for ink-jet printing and an ink-jet printing method.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods need no printing plate unlike the conventional printing methods. Therefore, it has been expected that the ink-jet printing methods can be used in extensive applications as on-demand printing methods that are adaptable for production of a small number and various kinds of prints. In particular, in recent years, there is an increasing demand for not only printed materials using a conventional printing medium having a white ground, such as a plain paper, but also printed materials using a printing medium having a non-white ground, such as a corrugated board, a paper board, a resin film, etc.

When producing printed materials using the printing medium having a non-white ground, a white ink is used for the purpose of expressing images with a white color or enhancing visibility of the images. As a pigment of the white ink, titanium oxide that is in the form of an inorganic pigment having a high hiding power has been frequently used.

In addition, for the purpose of improving dispersibility of the titanium oxide in the ink, a pigment dispersant has been used.

For example, JP 2009-24165A (Patent Literature 1) discloses a pigment dispersant that is constituted of an aromatic or heterocyclic vinyl monomer unit, an acid group-containing monomer unit, a (meth)acrylic acid ester monomer unit and a monomer unit containing a polyalkylene glycol chain having a specific molecular weight or a chain of a monoalkyl ether of the polyalkylene glycol, and has an acid value of 30 to 300 mgKOH/g. In the Patent Literature 1, it is described that titanium oxide is used as a pigment, and a pigment dispersion using the pigment dispersant can be used as a colorant for an aqueous coating material, an aqueous gravure ink, an aqueous ink-jet ink, an aqueous ink for stationeries, etc.

JP 60-123564A (Patent Literature 2) discloses a polymer that is used as a pigment dispersant capable of easily dispersing a pigment even when the dispersant is used in a small amount and providing an aqueous coating material that is free of deterioration in coating performance, and that is produced by copolymerizing a mono- or polyalkylene glycol-modified (meth)acrylic acid-based monomer, an ethylenically unsaturated nitrogen-containing monomer and an ethylenically unsaturated carboxylic acid-containing monomer.

On the other hand, in the ink-jet printing methods, as described, for example, in JP 2011-121344A (Patent Literature 3), an ink-jet printing apparatus having a mechanism of inhibiting precipitation of titanium oxide in an ink has been developed.

In the Patent Literature 3, there is disclosed the ink-jet printing apparatus that is equipped with a main tank, a sub tank, an ink supply means and an ink recovery means for the purpose of inhibiting precipitation of the titanium oxide in a white ink containing the titanium oxide as a pigment even after allowing the white ink to stand in the ink tank for a long period of time, and it is also described that by circulating the ink that is present in an ink path between the ink supply means and the ink recovery means, it is possible to maintain a concentration of the ink at a constant level.

SUMMARY OF THE INVENTION

The present invention relates to a water-based ink for ink-jet printing containing titanium oxide (A) and a pigment dispersant (B), in which:

the pigment dispersant (B) contains a constitutional unit derived from an anionic group-containing monomer (a) and a constitutional unit derived from a polyalkylene glycol (meth)acrylate (b);

an average molar number of addition of an alkyleneoxide in the polyalkylene glycol (meth)acrylate (b) is not less than 15 and not more than 100;

an acid value of the pigment dispersant (B) is not less than 100 mgKOH/g and not more than 400 mgKOH/g; and a content of the pigment dispersant (B) in the water-based ink is not less than 0.3 part by mass and not more than 18 parts by mass on the basis of 100 parts by mass of the titanium oxide (A).

DETAILED DESCRIPTION OF THE INVENTION

In the case where titanium oxide having a high specific gravity is used in an ink for ink-jet printing having a low viscosity, if a flow of the ink in an ink flow path of an ink-jet printing apparatus is temporarily stopped upon interruption of the printing operation, etc., the titanium oxide tends to suffer from precipitation or aggregation in the ink flow path.

The pigment dispersants described in the Patent Literatures 1 and 2 are mainly used in a coating material having a high viscosity. Therefore, if the pigment dispersants are used in a water-based ink for ink-jet printing, there tends to occur such a problem that the resulting ink fails to exhibit sufficient redispersibility after the titanium oxide suffers from precipitation or aggregation (hereinafter also referred to merely as "redispersibility").

In addition, if a white ink having poor redispersibility is used in the ink-jet printing apparatus described in the Patent Literature 3, there tends to occur a risk of causing clogging of nozzles therein even though circulation of the ink is periodically conducted. Furthermore, in the case where the printing operation is interrupted, it is necessary to circulate the ink to prevent precipitation of the ink. Therefore, it has been conventionally demanded to improve redispersibility of the ink by controlling a composition of the ink.

The present invention relates to a water-based ink for ink-jet printing which contains titanium oxide as a pigment and is excellent in redispersibility, as well as an ink-jet printing method.

Meanwhile, the term "printing" as used in the present invention is a concept that includes printing or typing for printing characters or images, and the term "printed material" as used in the present invention is a concept that includes printed matters or typed materials on which characters or images are printed.

In addition, the term "redispersion" as used in the present invention means that the titanium oxide (A) that has been precipitated or aggregated in the water-based ink is returned to the condition in which the titanium oxide (A) is well dispersed in the water-based ink.

The present inventors have found that by incorporating titanium oxide and a specific pigment dispersant at specific ratios into a water-based ink, it is possible to solve the aforementioned conventional problems.

That is, the present invention relates to the following aspects [1] and [2].

[1] A water-based ink for ink-jet printing containing titanium oxide (A) and a pigment dispersant (B), in which:

the pigment dispersant (B) contains a constitutional unit derived from an anionic group-containing monomer (a) and a constitutional unit derived from a polyalkylene glycol (meth)acrylate (b);

an average molar number of addition of an alkyleneoxide in the polyalkylene glycol (meth)acrylate (b) is not less than 15 and not more than 100;

an acid value of the pigment dispersant (B) is not less than 100 mgKOH/g and not more than 400 mgKOH/g; and a content of the pigment dispersant (B) in the water-based ink is not less than 0.3 part by mass and not more than 18 parts by mass on the basis of 100 parts by mass of the titanium oxide (A).

[2] An ink-jet printing method of ejecting the water-based ink described in the aforementioned item [1] onto a printing medium using an ink-jet printing apparatus to print characters or images on the printing medium, the ink-jet printing apparatus being equipped with a dispersing means for dispersing the titanium oxide (A) in the water-based ink, said method including the following steps 1 and 2:

Step 1: redispersing the water-based ink by the dispersing means; and

Step 2: ejecting the water-based ink redispersed in the step 1 onto the printing medium to print characters or images on the printing medium.

In accordance with the present invention, there are provided a water-based ink for ink-jet printing which contains titanium oxide as a pigment and is excellent in redispersibility, and an ink-jet printing method.

BRIEF DESCRIPTION OF THE DRAWING

FIG. 1 is an example of a schematic view showing a construction of an ink-jet printing apparatus used in the present invention.

WATER-BASED INK FOR INK-JET PRINTING

The water-based ink for ink-jet printing according to the present invention (hereinafter also referred to merely as a "water-based ink" or an "ink") contains titanium oxide (A) and a pigment dispersant (B) in which the pigment dispersant (B) contains a constitutional unit derived from an anionic group-containing monomer (a) and a constitutional unit derived from a polyalkylene glycol (meth)acrylate (b); an average molar number of addition of an alkyleneoxide in the polyalkylene glycol (meth)acrylate (b) is not less than 15 and not more than 100; an acid value of the pigment dispersant (B) is not less than 100 mgKOH/g and not more than 400 mgKOH/g; and a content of the pigment dispersant (B) in the water-based ink is not less than 0.3 part by mass and not more than 18 parts by mass on the basis of 100 parts by mass of the titanium oxide (A).

Meanwhile, the term "water-based" as used in the present specification means that water has a largest content among components of a dispersing medium contained in the ink.

The water-based ink of the present invention has such an advantageous effect that the water-based ink is excellent in redispersibility after the titanium oxide has been precipitated or aggregated in the ink. The reason why the aforementioned advantageous effect can be attained by the present invention is considered as follows though it is not clearly determined yet.

That is, the water-based ink of the present invention contains the titanium oxide as a pigment. The water-based ink also contains the pigment dispersant that is in the form of a polymer containing a constitutional unit derived from an anionic group-containing monomer and a constitutional unit derived from a polyalkylene glycol (meth)acrylate.

In this case, it is considered that by controlling the average molar number of addition of an alkyleneoxide in the aforementioned polyalkylene glycol (meth)acrylate to not less than 15 and not more than 100, an anionic group of the pigment dispersant is adsorbed onto the surface of the titanium oxide, so that it is possible to not only impart hydrophilicity to the titanium oxide by an alkylene glycol chain of the pigment dispersant, but also prevent the titanium oxide from suffering from aggregation or precipitation owing to steric repulsion force of the alkylene glycol chain which acts between particles of the titanium oxide. Furthermore, it is considered that by controlling the acid value of the pigment dispersant to not less than 100 mgKOH/g and not more than 400 mgKOH/g, the surface of the titanium oxide is electrically charged by the anionic group of the pigment dispersant, so that the effect of preventing the titanium oxide from suffering from aggregation or precipitation owing to electric repulsion force acting between the particles of the titanium oxide can be enhanced. As a result, it is considered that even though the titanium oxide suffers from precipitation or aggregation during printing or upon interruption of the printing, it is possible to readily redisperse the ink by applying a mechanical force such as stirring to the ink.

<Titanium Oxide (A)>

The water-based ink of the present invention contains the titanium oxide (A).

As the titanium oxide (A), there may be used rutile-type titanium oxide or anatase-type titanium oxide. Among these titanium oxides, from the viewpoint of attaining good stability and availability of the titanium oxide, preferred is rutile-type titanium oxide.

The titanium oxide (A) is preferably a surface-treated titanium oxide from the viewpoint of attaining good dispersibility thereof in the water-based ink. The surface treatment of the titanium oxide (A) is not particularly limited, and may be any surface treatment with an organic substance or an inorganic substance. From the viewpoint of avoiding adverse influence of a photocatalyst, preferred is titanium oxide that is surface-treated with an inorganic substance, and more preferred is titanium oxide that is surface-treated with silica and alumina.

The average primary particle size of the titanium oxide (A) is preferably not less than 100 nm, more preferably not less than 150 nm, even more preferably not less than 200 nm and further even more preferably not less than 250 nm from the viewpoint of improving whiteness of the resulting ink, and is also preferably not more than 500 nm, more preferably not more than 400 nm, even more preferably not more than 350 nm and further even more preferably not more than 300 nm from the viewpoint of improving redispersibility of the resulting ink.

Meanwhile, the average primary particle size of the titanium oxide (A) may be measured using a transmission electron microscope, more specifically, may be expressed by a number-average particle size of the titanium oxide (A) which is determined by extracting 500 titanium oxide primary particles by image analysis using a transmission electron microscope to measure particle sizes thereof and calculating an average value of the particle sizes. In the case where the titanium oxide (A) has a major axis diameter and a minor axis diameter, the average primary particle size of the titanium oxide (A) is calculated by using the major axis diameter thereof.

<Pigment Dispersant (B)>

The water-based ink of the present invention also contains the pigment dispersant (B) (hereinafter also referred to merely as a "dispersant (B)").

The dispersant (B) is in the form of a polymer that contains a constitutional unit derived from an anionic group-containing monomer (a) and a constitutional unit derived from a polyalkylene glycol (meth)acrylate (b) in which an average molar number of addition of an alkyleneoxide in the polyalkylene glycol (meth)acrylate (b) is not less than 15 and not more than 100; and an acid value of the pigment dispersant (B) is not less than 100 mgKOH/g and not more than 400 mgKOH/g.

The dispersant (B) is preferably a polymer that is produced by copolymerizing a monomer mixture containing the anionic group-containing monomer (a) and the polyalkylene glycol (meth)acrylate (b) (hereinafter also referred to merely as a "monomer mixture").

(Anionic Group-Containing Monomer (a))

The dispersant (B) used in the present invention contains a constitutional unit derived from an anionic group-containing monomer (a) (hereinafter also referred to merely as a "monomer (a)").

When neutralizing an anionic group of the dispersant (B), the dispersant is ionized and rendered water-soluble, so that it is possible to well disperse the titanium oxide in an aqueous medium.

The anionic group of the dispersant (B) is not particularly limited, and examples of the anionic group include a carboxy group, a sulfonic group and a phosphoric group. Among these groups, from the viewpoint of improving dispersion stability and ejection stability of the resulting ink, preferred is a carboxy group.

Examples of the carboxy group-containing monomer include monocarboxylic acid-based monomers such as (meth)acrylic acid and crotonic acid, dicarboxylic acid-based monomers such as fumaric acid, maleic acid and itaconic acid, etc. Among these carboxy group-containing monomers, from the viewpoint of improving redispersibility of the resulting ink, preferred is (meth)acrylic acid, and more preferred is methacrylic acid.

Meanwhile, the term "(meth)acrylic acid" as used herein means at least one compound selected from the group consisting of acrylic acid and methacrylic acid, and the "(meth)acrylic acid" as described hereinafter is also defined in the same way.

(Polyalkylene Glycol (Meth)acrylate (b))

The dispersant (B) used in the present invention contains a constitutional unit derived from a polyalkylene glycol (meth)acrylate (b) (hereinafter also referred to merely as a "monomer (b)") in which the average molar number of addition of an alkyleneoxide in the polyalkylene glycol moiety of the component (b) is not less than 15 and not more than 100.

Meanwhile, the term "(meth)acrylate" as used herein means at least one compound selected from the group consisting of an acrylate and a methacrylate, and the "(meth) acrylate" as described hereinafter is also defined in the same way.

Examples of the alkyleneoxide include alkyleneoxides having not less than 2 and not more than 4 carbon atoms, such as ethyleneoxide, propyleneoxide and butyleneoxide. Among these alkyleneoxides, from the viewpoint of improving redispersibility of the resulting ink, preferred is ethyleneoxide.

The average molar number of addition of the aforementioned alkyleneoxide in the polyalkylene glycol (meth) acrylate (b) is not less than 15, preferably not less than 20 and more preferably not less than 22 from the viewpoint of improving redispersibility of the resulting ink, and is also not more than 100, preferably not more than 90, more preferably not more than 50 and even more preferably not more than 35 from the same viewpoint as described above.

The constitutional unit derived from the polyalkylene glycol (meth)acrylate (b) is specifically a constitutional unit derived from a polyalkylene glycol (meth)acrylate (b-1) represented by the following formula (1) (hereinafter also referred to merely as a "monomer (b-1)").

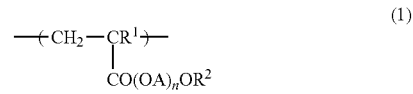

wherein $R^1$ is a hydrogen atom or a methyl group; $R^2$ is a hydrogen atom or an alkyl group having not less than 1 and not more than 20 carbon atoms; OA is an oxyalkylene group having not less than 2 and not more than 4 carbon atoms; and n represents an average molar number of addition of an alkyleneoxide, and is a number of not less than 15 and not more than 100.

In the aforementioned formula (1), the number of carbon atoms in OA as an oxyalkylene group is not less than 2 and not more than 4, preferably not less than 2 and not more than 3, and more preferably 2, from the viewpoint of improving redispersibility of the resulting ink. Examples of the oxyalkylene group having not less than 2 and not more than 4 carbon atoms include an oxyethylene group, an oxypropylene group and an oxybutylene group. Among these oxyalkylene groups, from the viewpoint of improving redispersibility of the resulting ink, preferred is at least one group selected from the group consisting of an oxyethylene group and an oxypropylene group, and more preferred is an oxyethylene group.

In the aforementioned formula (1), from the viewpoint of improving redispersibility of the resulting ink, $R^1$ is a hydrogen atom or a methyl group, and preferably a methyl group.

In the aforementioned formula (1), from the viewpoint of improving redispersibility of the resulting ink, $R^2$ is a hydrogen atom or an alkyl group having not less than 1 and not more than 20 carbon atoms, preferably a hydrogen atom or an alkyl group having not less than 1 and not more than 8 carbon atoms, more preferably a hydrogen atom or an alkyl group having not less than 1 and not more than 3 carbon atoms, and even more preferably a methyl group. The alkyl group may be in the form of either a straight chain or a branched chain.

In the aforementioned formula (1), n that represents an average molar number of addition of the alkyleneoxide is a number of not less than 15, preferably not less than 20 and more preferably not less than 22 from the viewpoint of improving redispersibility of the resulting ink, and is also a number of not more than 100, preferably not more than 90, more preferably not more than 50 and even more preferably not more than 35 from the same viewpoint as described above.

However, the oxyalkylene groups in the number of n may be the same or different from each other. In addition, when the oxyalkylene groups are different from each other, these oxyalkylene groups may be bonded to each other in any of a block addition form, a random addition form and an alternate addition form.

Examples of the monomer (b-1) represented by the aforementioned formula (1) include at least one monomer selected from the group consisting of polyethylene glycol mono(meth)acrylate; and alkoxy polyethylene glycol mono(meth)acrylates such as methoxy polyethylene glycol mono(meth)acrylate, ethoxy polyethylene glycol mono(meth)acrylate, propoxy polyethylene glycol mono(meth)acrylate, butoxy polyethylene glycol mono(meth)acrylate, octoxy polyethylene glycol mono(meth)acrylate and stearoxy polyethylene glycol mono(meth)acrylate. Among these monomers, from the viewpoint of improving redispersibility of the resulting ink, preferred are alkoxy polyethylene glycol mono(meth)acrylates, more preferred is at least one monomer selected from the group consisting of methoxy polyethylene glycol mono(meth)acrylate, ethoxy polyethylene glycol mono(meth)acrylate and propoxy polyethylene glycol mono(meth)acrylate, and even more preferred is methoxy polyethylene glycol mono(meth)acrylate.

Specific examples of commercially available products of the monomer (b-1) include "NK ESTER M-230G", "NK ESTER M-450G" and "NK ESTER M-900G" all available from Shin-Nakamura Chemical Co., Ltd.; "BLEMMER PME-1000" and "BLEMMER PME-4000" both available from NOF Corporation; and "LIGHT ESTER 041MA" available from Kyoeisha Chemical Co., Ltd., etc.

The content of the constitutional unit derived from the monomer (a) in the whole constitutional units of the dispersant (B) is preferably not less than 3% by mass, more preferably not less than 5% by mass, even more preferably not less than 10% by mass and further even more preferably not less than 15% by mass from the viewpoint of improving dispersion stability and ejection stability of the resulting ink, and is also preferably not more than 35% by mass, more preferably not more than 30% by mass, even more preferably not more than 25% by mass and further even more preferably not more than 20% by mass from the same viewpoint as described above.

The content of the constitutional unit derived from the monomer (b) in the whole constitutional units of the dispersant (B) is preferably not less than 65% by mass, more preferably not less than 70% by mass, even more preferably not less than 75% by mass and further even more preferably not less than 80% by mass from the viewpoint of improving redispersibility of the resulting ink, and is also preferably not more than 97% by mass, more preferably not more than 95% by mass, even more preferably not more than 90% by mass and further even more preferably not more than 85% by mass from the same viewpoint as described above.

The dispersant (B) used in the present invention may also contain constitutional units other than the constitutional unit derived from the monomer (a) and the constitutional unit derived from the monomer (b) unless the advantageous effects of the present invention are adversely influenced by the inclusion of the other constitutional units. However, in this case, the total content of the constitutional unit derived from the monomer (a) and the constitutional unit derived from the monomer (b) in the dispersant (B) is preferably not less than 50% by mass, more preferably not less than 70% by mass and even more preferably not less than 90% by mass, and further even more preferably the dispersant (B) is constituted of the constitutional unit derived from the monomer (a) and the constitutional unit derived from the monomer (b) solely.

(Production of Pigment Dispersant (B))

The pigment dispersant (B) may be produced by copolymerizing a monomer mixture containing the monomer (a) and the monomer (b) by known polymerization methods. Among the polymerization methods, from the viewpoint of well controlling a molecular weight of the resulting polymer, preferred is a solution polymerization method.

The solvent used in the solution polymerization method is not particularly limited, and preferred examples of the solvent include water; aliphatic alcohols having not less than 1 and not more than 3 carbon atoms; ketones having not less than 3 and not more than 8 carbon atoms; esters such as ethyl acetate; and mixed solvents constituted of water and at least one of these organic solvents. From the viewpoint of directly using the solvent as such without removal thereof upon production of the below-mentioned titanium oxide dispersion, among these solvents, more preferred is water.

As the polymerization initiator, any suitable polymerization initiators may be used as long as they can be effectively used in ordinary solution polymerization methods. Among these polymerization initiators, preferred is a persulfate, and more preferred is ammonium persulfate.

As the chain transfer agent, preferred are mercaptans, and more preferred is 2-mercaptoethanol.

The polymerization initiator is preferably used in an amount of not less than 0.01 part by mass, more preferably not less than 0.05 part by mass and even more preferably not less than 0.1 part by mass on the basis of 100 parts by mass of a total amount of the monomers used in the monomer mixture from the viewpoint of well controlling a molecular weight distribution of the resulting dispersant (B), and is also preferably used in an amount of not more than 5 parts by mass, more preferably not more than 3 parts by mass and even more preferably not more than 2 parts by mass on the basis of 100 parts by mass of a total amount of the monomers used in the monomer mixture from the same viewpoint as described above.

The chain transfer agent is preferably used in an amount of not less than 0.01 part by mass, more preferably not less than 0.05 part by mass and even more preferably not less than 0.1 part by mass on the basis of 100 parts by mass of a total amount of the monomers used in the monomer mixture from the viewpoint of well controlling a molecular weight distribution of the resulting dispersant (B), and is also preferably used in an amount of not more than 5 parts by mass, more preferably not more than 3 parts by mass and even more preferably not more than 2 parts by mass on the basis of 100 parts by mass of a total amount of the monomers used in the monomer mixture from the same viewpoint as described above.

(Contents of Respective Monomers in Monomer Mixture)

Upon production of the dispersant (B), the contents of the aforementioned monomers (a) and (b) in the monomer mixture (contents of non-neutralized components; hereinafter defined in the same way) are as follows from the viewpoint of improving dispersion stability of the resulting ink.

The content of the monomer (a) in the monomer mixture is preferably not less than 3% by mass, more preferably not less than 5% by mass, even more preferably not less than 10% by mass and further even more preferably not less than 15% by mass, and is also preferably not more than 35% by mass, more preferably not more than 30% by mass, even more preferably not more than 25% by mass and further even more preferably not more than 20% by mass.

The content of the monomer (b) in the monomer mixture is preferably not less than 65% by mass, more preferably not less than 70% by mass, even more preferably not less than 75% by mass and further even more preferably not less than 80% by mass, and is also preferably not more than 97% by mass, more preferably not more than 95% by mass, even more preferably not more than 90% by mass and further even more preferably not more than 85% by mass.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours.

In the case where a persulfate is used as the polymerization initiator, the polymerization temperature is preferably not lower than 70° C. and more preferably not lower than 75° C. from the viewpoint of improving the reactivity of the polymerization reaction, and is also preferably not higher than 85° C. and more preferably not higher than 83° C. from the viewpoint of well controlling a molecular weight distribution of the resulting dispersant (B).

In addition, the polymerization is preferably conducted in a nitrogen gas atmosphere or an atmosphere of an inert gas such as argon.

After completion of the polymerization reaction, the dispersant (B) thus produced may be isolated from the reaction solution by conventionally known methods such as reprecipitation and removal of the solvent by distillation. In addition, the thus obtained dispersant (B) may be subjected to reprecipitation, membrane separation, chromatography, extraction, etc., for removing unreacted monomers, etc., therefrom.

The dispersant (B) is preferably used as such in the form of a solution of the dispersant (B) without removing the solvent used in the polymerization reaction therefrom from the viewpoint of enhancing productivity of the below-mentioned titanium oxide dispersion.

Furthermore, the dispersant (B) contains the constitutional unit derived from the anionic group-containing monomer (a), and therefore can be ionized and rendered water-soluble by neutralizing the anionic group thereof.

Examples of a neutralizing agent used for neutralizing the anionic group include ammonia; organic amines such as ethylamine, diethylamine, trimethylamine, triethylamine and triethanolamine; and hydroxides of alkali metals such as lithium hydroxide, sodium hydroxide and potassium hydroxide. Among these neutralizing agents, from the viewpoint of improving redispersibility of the resulting ink, preferred are hydroxides of alkali metals, and more preferred is sodium hydroxide. These neutralizing agents may be used alone or in the form of a mixture of any two or more thereof.

The neutralizing agent is preferably used in the form of an aqueous neutralizing agent solution. The concentration of the aqueous neutralizing agent solution is preferably not less than 10% by mass, more preferably not less than 20% by mass and even more preferably not less than 30% by mass, and is also preferably not more than 65% by mass, more preferably not more than 60% by mass and even more preferably not more than 55% by mass, from the viewpoint of fully promoting the neutralization of the anionic group of the dispersant (B).

The acid value of the dispersant (B) is not less than 100 mgKOH/g, preferably not less than 110 mgKOH/g, more preferably not less than 120 mgKOH/g, even more preferably not less than 150 mgKOH/g, further even more preferably not less than 180 mgKOH/g and still further even more preferably not less than 200 mgKOH/g from the viewpoint of improving redispersibility of the resulting ink, and is also not more than 400 mgKOH/g, preferably not more than 350 mgKOH/g, more preferably not more than 300 mgKOH/g and even more preferably not more than 280 mgKOH/g from the same viewpoint as described above.

Meanwhile, the acid value of the dispersant (B) may be measured according to a potentiometric titration method prescribed in JIS K 0070.

The weight-average molecular weight of the dispersant (B) as measured in terms of a polystyrene is preferably not less than 5,000, more preferably not less than 20,000 and even more preferably not less than 40,000 from the viewpoint of improving dispersion stability of the resulting ink, and is also preferably not more than 500,000, more preferably not more than 300,000, even more preferably not more than 150,000, further even more preferably not more than 100,000 and still further even more preferably not more than 70,000 from the viewpoint of improving redispersibility of the resulting ink.

Meanwhile, the weight-average molecular weight of the dispersant (B) may be measured by the method described in Examples below.

<Organic Solvent (C)>

The water-based ink of the present invention preferably further contains at least one organic solvent (C) having a boiling point of not lower than 90° C. from the viewpoint of suppressing excessive increase in viscosity of the ink owing to the dispersant (B) as well as from the viewpoint of improving redispersibility of the resulting ink.

The boiling point of the organic solvent (C) is preferably not lower than 100° C., more preferably not lower than 120° C., even more preferably not lower than 150° C., further even more preferably not lower than 160° C., still further even more preferably not lower than 170° C. and still further even more preferably not lower than 180° C. from the viewpoint of preventing the ink from being dried in ink-jet nozzles, and is also preferably not higher than 300° C., more preferably not higher than 290° C., even more preferably not higher than 280° C. and further even more preferably not higher than 250° C. from the viewpoint of improving whiteness of the resulting ink.

As the boiling point of the organic solvent is lowered, the saturated vapor pressure of the organic solvent as measured at a specific temperature is increased, so that the evaporation rate of the organic solvent as measured at the specific temperature is also increased. In addition, as the content of the organic solvent having a high evaporation rate as measured at a specific temperature in a mixed organic solvent is increased, the evaporation rate of the mixed organic solvent as measured at the specific temperature is also increased.

In the case where a mixed organic solvent constituted of two or more organic solvents is used as the organic solvent (C), the boiling point of the organic solvent (C) is represented by a weighted mean value of boiling points of the two or more organic solvents which are weighted by contents (% by mass) of the respective organic solvents constituting the organic solvent (C). The weighted mean value thus calculated as the boiling point of the organic solvent (C) is an index of the evaporation rate of the mixed organic solvent.

Examples of the compound used as the organic solvent (C) include polyhydric alcohols, polyhydric alcohol alkyl ethers, nitrogen-containing heterocyclic compounds, amides, amines and sulfur-containing compounds. The polyhydric alcohols may be used in the form of a mixed alcohol containing a plurality of compounds belonging to the concept of polyhydric alcohols, and the polyhydric alcohol alkyl ethers may also be used in the form of a mixed ether containing a plurality of compounds belonging to the concept of polyhydric alcohol alkyl ethers.

Examples of the polyhydric alcohols include ethylene glycol (boiling point (b.p.) 197° C.), diethylene glycol (b.p. 244° C.), polyethylene glycol, propylene glycol (b.p. 188° C.), dipropylene glycol (b.p. 232° C.), polypropylene glycol, 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 1,2-hexanediol (b.p. 223° C.), 1,6-hexanediol (b.p. 250° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.). In addition, it is preferred that a compound having a boiling point of not lower than 250° C. such as triethylene glycol (b.p. 285° C.), tripropylene glycol (b.p. 273° C.), glycerol (b.p. 290° C.) and the like is used in combination with a compound having a boiling point of lower than 250° C.

Examples of the polyhydric alcohol alkyl ethers include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monobutyl ether (b.p. 227° C.), dipropylene glycol monomethyl ether (b.p. 90° C.), tripropylene glycol monomethyl ether (b.p. 100° C.) and tripropylene glycol monobutyl ether. In addition, it is preferred that a compound having a boiling point of not lower than 250° C. such as triethylene glycol monobutyl ether (b.p. 276° C.) and the like is used in combination with a compound having a boiling point of lower than 250° C.

Examples of the nitrogen-containing heterocyclic compounds include N-methyl-2-pyrrolidone (b.p. 202° C.), 2-pyrrolidone (b.p. 245° C.), 1,3-dimethyl-2-imidazolidinone (b.p. 220° C.) and s-caprolactam (b.p. 136° C.).

Examples of the amides include formamide (b.p. 210° C.), N-methyl formamide (b.p. 199° C.) and N,N-dimethyl formamide (b.p. 153° C.).

Examples of the amines include monoethanolamine (b.p. 170° C.), diethanolamine (b.p. 217° C.), triethanolamine (b.p. 208° C.) and triethylamine (b.p. 90° C.).

Examples of the sulfur-containing compounds include dimethyl sulfoxide (b.p. 189° C.), etc. In addition, it is preferred that a compound having a boiling point of not lower than 250° C., such as sulfolane (b.p. 285° C.) and thiodiglycol (b.p. 282° C.) is used in combination with a compound having a boiling point of lower than 250° C.

<Surfactant (D)>

The water-based ink of the present invention may further contain a surfactant (D) from the viewpoint of improving redispersibility of the resulting ink.

As the surfactant (D), from the viewpoint of improving redispersibility of the resulting ink, preferred is a nonionic surfactant. Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide to a saturated or unsaturated, linear or branched higher alcohol having not less than 8 and not more than 22 carbon atoms, a polyhydric alcohol or an aromatic alcohol, (2) esters of a higher alcohol containing a saturated or unsaturated, linear or branched hydrocarbon group having not less than 8 and not more than 22 carbon atoms, and a polyvalent fatty acid, (3) polyoxyalkylene aliphatic amines containing a linear or branched alkyl group or alkenyl group having not less than 8 and not more than 20 carbon atoms, and (4) ester compounds of a higher fatty acid having not less than 8 and not more than 22 carbon atoms and a polyhydric alcohol, or compounds produced by adding ethyleneoxide, propyleneoxide or butyleneoxide to the ester compounds.

The nonionic surfactant is preferably an acetylene glycol-based surfactant. Specific examples of the acetylene glycol-based surfactant include at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol and ethyleneoxide adducts of these compounds. Among these acetylene glycol-based surfactants, preferred is at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol and ethyleneoxide adducts of these compounds, and more preferred is at least one compound selected from the group consisting of 2,4,7,9-tetramethyl-5-decyne-4,7-diol and ethyleneoxide adducts of the compound.

Examples of commercially available products of the nonionic surfactant include "SURFYNOL 104P G50" (a propylene glycol solution of 2,4,7,9-tetramethyl-5-decyne-4,7-diol; active ingredient content: 50%), "SURFYNOL 465" (ethyleneoxide (hereinafter also referred to merely as "EO") adduct of 2,4,7,9-tetramethyl-5-decyne-4,7-diol; average molar number of addition of EO: 10), "SURFYNOL 485" (EO adduct of 2,4,7,9-tetramethyl-5-decyne-4,7-diol; average molar number of addition of EO: 30) and "OLEFIN E1010" (EO adduct of 2,4,7,9-tetramethyl-5-decyne-4,7-diol; average molar number of addition of EO: 10) all available from Nissin Chemical Industry Co., Ltd., and Air Products & Chemicals, Inc., "ACETYLENOL E81" (average molar number of addition of EO: 8.1), "ACETYLENOL E100" (average molar number of addition of EO: 10) and "ACETYLENOL E200" (average molar number of addition of EO: 20) all available from Kawaken Fine Chemicals Co., Ltd., and "EMULGEN 120" (polyoxyethylene lauryl ether) available from Kao Corporation.

[Other Components]

The water-based ink of the present invention may also contain, in addition to the titanium oxide (A) and the dispersant (B), various ordinary additives such as a wetting agent, a penetrant, a dispersant other than the dispersant (B), a viscosity controller, a defoaming agent, a mildew-proof agent, a rust preventive and an ultraviolet absorber.

[Process for Producing Water-Based Ink for Ink-Jet Printing]

In the production of the water-based ink of the present invention, it is preferred that the titanium oxide (A) and the dispersant (B) are previously mixed to prepare a titanium oxide dispersion (P), and then the thus prepared titanium oxide dispersion (P) is incorporated into the water-based ink of the present invention.

(Titanium Oxide Dispersion (P))

The method of preparing the titanium oxide dispersion (P) used in the present invention is not particularly limited. From the viewpoint of improving redispersibility of the resulting ink, the titanium oxide dispersion (P) is preferably prepared by dispersing a mixture obtained by mixing the titanium oxide (A), the dispersant (B) and water, if required, together with the other additives, using a disperser. The titanium oxide dispersion (P) may be prepared by dispersing the aforementioned mixture only one time. However, from the viewpoint of obtaining a uniform dispersion, the titanium oxide dispersion (P) is prepared by first subjecting the aforementioned mixture to preliminary dispersion treatment and then to substantial dispersion treatment using the disperser.

The disperser that may be used in the aforementioned dispersion treatment is not particularly limited. Examples of the disperser include a kneading mixer such as kneaders; a media-type disperser such as an attritor, a ball mill and a sand mill using glass beads, zirconia beads, etc.; a colloid mill; and the like.

The temperature used in the dispersion treatment is preferably not lower than 10° C. and not higher than 35° C., more preferably not lower than 15° C. and not higher than 30° C., and even more preferably not lower than 18° C. and not higher than 27° C. from the viewpoint of reducing viscosity of the titanium oxide dispersion (P).

The dispersing time is preferably not less than 2 hours and not more than 200 hours, and more preferably not less than 3 hours and not more than 50 hours, from the viewpoint of fully atomizing the titanium oxide.

The content of the titanium oxide (A) in the titanium oxide dispersion (P) used in the present invention is preferably not less than 10% by mass, more preferably not less than 20% by mass and even more preferably not less than 25% by mass from the viewpoint of improving dispersion stability of the titanium oxide dispersion (P), and is also preferably not more than 80% by mass, more preferably not more than 70% by mass, even more preferably not more than 60% by mass and further even more preferably not more than 50% by mass from the same viewpoint as described above.

The content of the dispersant (B) in the titanium oxide dispersion (P) used in the present invention is preferably not less than 0.3 part by mass, more preferably not less than 0.5 part by mass, even more preferably not less than 1.0 part by mass and further even more preferably not less than 1.5 parts by mass on the basis of 100 parts by mass of the titanium oxide (A) from the viewpoint of improving dispersion stability of the titanium oxide dispersion (P), and is also preferably not more than 18 parts by mass, more preferably not more than 10 parts by mass, even more preferably not more than 5 parts by mass and further even more preferably not more than 3 parts by mass on the basis of 100 parts by mass of the titanium oxide (A) from the same viewpoint as described above.

The titanium oxide dispersion (P) is suitably used as a dispersion for a water-based ink for ink-jet printing from the viewpoint of improving redispersibility of the resulting ink.

The water-based ink of the present invention may be produced by mixing the titanium oxide dispersion (P) and water, if required, together with various additives, and then stirring the obtained mixture.

The contents of the respective components in the water-based ink of the present invention as well as various properties of the water-based ink are as follows from the viewpoint of improving redispersibility of the resulting ink.

(Content of Titanium Oxide (A))

The content of the titanium oxide (A) in the water-based ink is preferably not less than 1.0% by mass, more preferably not less than 3.0% by mass and even more preferably not less than 5.0% by mass from the viewpoint of enhancing whiteness of the water-based ink, and is also preferably not more than 20% by mass, more preferably not more than 17% by mass and even more preferably not more than 15% by mass from the viewpoint of improving redispersibility of the water-based ink.

(Content of Pigment Dispersant (B))

The content of the dispersant (B) in the water-based ink is preferably not less than 0.3 part by mass, more preferably not less than 0.5 part by mass, even more preferably not less than 1.0 part by mass and further even more preferably not less than 1.5 parts by mass on the basis of 100 parts by mass of the titanium oxide (A) from the viewpoint of improving dispersion stability of the water-based ink, and is also preferably not more than 18 parts by mass, more preferably not more than 10 parts by mass, even more preferably not more than 5 parts by mass and further even more preferably not more than 3 parts by mass on the basis of 100 parts by mass of the titanium oxide (A) from the viewpoint of improving redispersibility of the water-based ink.

(Content of Organic Solvent (C))

The content of the organic solvent (C) in the water-based ink is preferably not less than 5% by mass, more preferably not less than 10% by mass and even more preferably not less than 15% by mass from the viewpoint of improving redispersibility of the water-based ink, and is also preferably not more than 35% by mass, more preferably not more than 30% by mass and even more preferably not more than 25% by mass from the same viewpoint as described above.

(Content of Surfactant (D))

The content of the surfactant (D) in the water-based ink is preferably not less than 0.01% by mass, more preferably not less than 0.03% by mass, even more preferably not less than 0.05% by mass and further even more preferably not less than 0.07% by mass from the viewpoint of improving redispersibility of the water-based ink, and is also preferably not more than 5.0% by mass, more preferably not more than 3.0% by mass, even more preferably not more than 1.0% by mass and further even more preferably not more than 0.5% by mass from the same viewpoint as described above.

(Content of Water)

The content of water in the water-based ink is preferably not less than 40% by mass and more preferably not less than 50% by mass from the viewpoint of improving redispersibility of the water-based ink, and is also preferably not more than 80% by mass and more preferably not more than 70% by mass from the same viewpoint as described above.

(Properties of Water-Based Ink)

The viscosity of the water-based ink as measured at 20° C. is preferably not less than 2.0 mPa·s, more preferably not less than 3.0 mPa·s and even more preferably not less than 3.5 mPa·s from the viewpoint of improving redispersibility of the water-based ink, and is also preferably not more than 12 mPa·s, more preferably not more than 9.0 mPa·s, even more preferably not more than 7.0 mPa·s, further even more preferably not more than 5.5 mPa·s and still further even more preferably not more than 4.5 mPa·s from the same viewpoint as described above.

Meanwhile, the viscosity at 20° C. of the water-based ink may be measured by the method described in Examples below.

The pH value of the water-based ink as measured at 20° C. is preferably not less than 5.5, more preferably not less than 6.0 and even more preferably not less than 6.5 from the viewpoint of improving redispersibility of the water-based ink, and is also preferably not more than 11.0, more preferably not more than 10.0, even more preferably not more than 9.5 and further even more preferably not more than 9.0 from the viewpoint of improving the resistance of members to the ink and suppressing skin irritation.

Meanwhile, the pH value at 20° C. of the water-based ink may be measured by the method described in Examples below.

[Ink-Jet Printing Method]

The ink-jet printing method of the present invention is a method of ejecting the aforementioned water-based ink onto a printing medium using an ink-jet printing apparatus to print characters or images on the printing medium in which the ink-jet printing apparatus is equipped with a dispersing means for dispersing the titanium oxide (A) in the water-based ink, said method including the following steps 1 and 2:

Step 1: redispersing the water-based ink by the dispersing means; and

Step 2: ejecting the water-based ink redispersed in the step 1 onto the printing medium to print characters or images on the printing medium.

<Step 1>

The ink-jet printing method of the present invention includes the step 1 of redispersing the aforementioned water-based ink by the dispersing means.

When using the aforementioned water-based ink in the ink-jet printing method, it is possible to readily redisperse the titanium oxide (A) in the water-based ink by the dispersing means of the aforementioned ink-jet printing apparatus during printing or after interruption of the printing even in the case where the titanium oxide (A) dispersed in the water-based ink suffers from precipitation or aggregation.

The ink-jet printing apparatus used in the present invention includes at least an ink ejection means, a container filled with the aforementioned water-based ink (ink container), an ink flow path and the aforementioned dispersing means for dispersing the titanium oxide (A) contained in the water-based ink. The ink container may further include a preliminary ink container.

As the dispersing means, there may be used any suitable means as long as it is capable of dispersing the titanium oxide (A) in an aqueous medium contained in the water-based ink by applying a mechanical force to the ink.

FIG. 1 is an example of a schematic view showing a construction of an ink-jet printing apparatus used in the present invention.

In FIG. 1, the ink-jet printing apparatus includes an ink ejection means 1, an ink container 2, an ink flow path 3 and a stirring mechanism 4 as the dispersing means. Also, in FIG. 1, reference numeral 5 denotes a printing medium.

The stirring mechanism 4 is not particularly limited as long as it is capable of stirring the ink within the ink container 2. For example, by operating the stirring mechanism 4, the ink within the ink container 2 is stirred to disperse the titanium oxide (A) therein. As the stirring mechanism 4, there may be mentioned an agitation blade that is rotationally operated by a stirring motor as well as a stirrer that is rotationally operated by an external magnetic field, etc. The stirring conditions may be adjusted by controlling a temperature, a time interval of stirring operations, a stirring speed, a stirring time, etc.

Examples of the other dispersing means include a means that can be operated by a shaking mechanism for shaking the ink container, a vibration-applying mechanism for applying a vibration force to the ink container, a circulating mechanism for circulating the ink, and the like.

The dispersing means using the aforementioned shaking mechanism has a function of shaking the ink container by means of a shaking device to disperse the titanium oxide (A) in the ink. The shaking conditions may be adjusted by controlling a temperature, a frequency of shaking operations, a shaking time and the like.

As the vibration-applying mechanism, there may be used, for example, an ultrasonic vibrator. The dispersing means using the ultrasonic vibrator has a function of applying ultrasonic vibration to the ink container to disperse the titanium oxide (A) in the ink. The ultrasonic vibration conditions may be adjusted by controlling a temperature, a frequency, an ultrasonic vibration applying time and the like.

For example, in the case where the ink-jet printing apparatus is further provided with the preliminary ink container, the dispersing means using the circulating mechanism has a function of circulating the ink through the ink flow path between the ink container and the preliminary ink container to disperse the titanium oxide (A) in the ink. The aforementioned circulating mechanism is not particularly limited as long as it is capable of circulating the ink. Examples of the circulating mechanism include a pump, a heat source, etc. Of these circulating mechanisms, from the viewpoint of improving redispersibility of the water-based ink, preferred is a pump.

<Step 2>

The ink-jet printing method of the present invention also includes the step 2 of ejecting the water-based ink redispersed in the step 1 onto the printing medium to print characters or images on the printing medium.

In FIG. 1, the water-based ink redispersed in the step 1 is ejected by the ink ejection means 1 to print characters or images on the printing medium 5.

As the method of ejecting the ink by the ink ejection means, there may be mentioned a method of ejecting the ink using a thermal-type ink-jet print head or a piezoelectric-type ink-jet print head. In the present invention, there is preferably used the method in which the container filled with the water-based ink is mounted to the ink-jet printing apparatus, and then the ink is ejected using the piezoelectric-type ink-jet print head to print characters or images on the printing medium.

By using the water-based ink redispersed in the step 1, the ink can be prevented from suffering from aggregation or precipitation in nozzles of the ink-jet print head, so that it is possible to obtain good printed materials.

The water-based ink for ink-jet printing and the ink-jet printing method according to the present invention are preferably used for solid image printing such as backing or ground printing, etc., from the viewpoint of utilizing good whiteness of the ink. Examples of the printing medium used for the water-based ink for ink-jet printing and the ink-jet printing method according to the present invention include a corrugated board, a paper board, a resin film, etc.

Examples of the resin film include a polyester film, a polyvinyl chloride film, a polypropylene film, a polyethylene film and a nylon film. These films may be subjected to surface treatments such as corona treatment, etc., if required.

Examples of the generally available resin films include "LUMIRROR T60" (polyethylene terephthalate; thickness: 125 µm; 60° gloss: 189.1; water absorption: 2.3 g/m$^2$) available from Toray Industries, Inc., "PVC80B P" (polyvinyl chloride; 60° gloss: 58.8; water absorption: 1.4 g/m$^2$) available from Lintec Corporation, "KINATH KEE 70CA" (polyethylene) available from Lintec Corporation, "YUPO SG90 PAT1" (polypropylene) available from Lintec Corporation and "BONYL RX" (nylon) available from KOHJIN Film & Chemicals Co., Ltd.

With respect to the aforementioned embodiments, the present invention further provides the following aspects relating to the water-based ink and the ink-jet printing method.

<1> A water-based ink for ink-jet printing containing titanium oxide (A) and a pigment dispersant (B), in which:
the pigment dispersant (B) contains a constitutional unit derived from an anionic group-containing monomer (a) and a constitutional unit derived from a polyalkylene glycol (meth)acrylate (b);
an average molar number of addition of an alkyleneoxide in the polyalkylene glycol (meth)acrylate (b) is not less than 15 and not more than 100;
an acid value of the pigment dispersant (B) is not less than 100 mgKOH/g and not more than 400 mgKOH/g; and
a content of the pigment dispersant (B) in the water-based ink is not less than 0.3 part by mass and not more than 18 parts by mass on the basis of 100 parts by mass of the titanium oxide (A).

<2> The water-based ink for ink-jet printing according to the aspect <1>, wherein the titanium oxide (A) is preferably a titanium oxide surface-treated with an inorganic substance, and more preferably a titanium oxide surface-treated with silica and alumina.

<3> The water-based ink for ink-jet printing according to the aspect <1> or <2>, wherein an average primary particle size of the titanium oxide (A) is preferably not less than 100 nm, more preferably not less than 150 nm, even more preferably not less than 200 nm and further even more preferably not less than 250 nm, and is also preferably not more than 500 nm, more preferably not more than 400 nm, even more preferably not more than 350 nm and further even more preferably not more than 300 nm.

<4> The water-based ink for ink-jet printing according to any one of the aspects <1> to <3>, wherein an anionic group of the anionic group-containing monomer (a) is preferably a carboxy group.

<5> The water-based ink for ink-jet printing according to any one of the aspects <1> to <4>, wherein the anionic group-containing monomer (a) is preferably at least one monomer selected from the group consisting of acrylic acid and methacrylic acid, and more preferably methacrylic acid.

<6> The water-based ink for ink-jet printing according to any one of the aspects <1> to <5>, wherein the alkyleneoxide is preferably an alkyleneoxide having not less than 2 and not more than 4 carbon atoms, and more preferably ethyleneoxide.

<7> The water-based ink for ink-jet printing according to any one of the aspects <1> to <6>, wherein an average molar number of addition of the alkyleneoxide is not less than 15, preferably not less than 20 and more preferably not less than 22, and is also preferably not more than 90, more preferably not more than 50 and even more preferably not more than 35.

<8> The water-based ink for ink-jet printing according to any one of the aspects <1> to <7>, wherein the constitutional unit derived from the polyalkylene glycol (meth)acrylate (b) is a constitutional unit derived from a polyalkylene glycol (meth)acrylate (b-1) represented by the following formula (1):

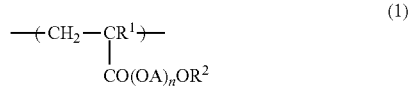

$$-\!\!-\!\!(CH_2-CR^1)\!\!-\!\!- \quad (1)$$
$$\phantom{-\!\!-\!\!(CH_2-}CO(OA)_nOR^2$$

wherein $R^1$ is a hydrogen atom or a methyl group; $R^2$ is a hydrogen atom or an alkyl group having not less than 1 and not more than 20 carbon atoms; OA is an oxyalkylene group having not less than 2 and not more than 4 carbon atoms; and n represents an average molar number of addition of an alkyleneoxide, and is a number of not less than 15 and not more than 100.

<9> The water-based ink for ink-jet printing according to the aspect <8>, wherein in the aforementioned formula (1), OA as the oxyalkylene group is preferably at least one group selected from the group consisting of an oxyethylene group and an oxypropylene group, and more preferably an oxyethylene group.

<10> The water-based ink for ink-jet printing according to the aspect <8> or <9>, wherein in the aforementioned formula (1), $R^2$ is preferably a hydrogen atom or an alkyl group having not less than 1 and not more than 8 carbon atoms, more preferably a hydrogen atom or an alkyl group having not less than 1 and not more than 3 carbon atoms, and even more preferably a methyl group.

<11> The water-based ink for ink-jet printing according to any one of the aspects <8> to <10>, wherein in the aforementioned formula (1), n that represents an average molar number of addition of the alkyleneoxide is preferably a number of not less than 20 and more preferably not less than 22, and is also preferably a number of not more than 90, more preferably not more than 50 and even more preferably not more than 35.

<12> The water-based ink for ink-jet printing according to any one of the aspects <8> to <11>, wherein the monomer (b-1) represented by the aforementioned formula (1) is preferably an alkoxy polyethylene glycol mono(meth)acrylate, more preferably at least one monomer selected from the group consisting of methoxy polyethylene glycol mono (meth)acrylate, ethoxy polyethylene glycol mono(meth)acrylate and propoxy polyethylene glycol mono(meth)acrylate, and even more preferably methoxy polyethylene glycol mono(meth)acrylate.

<13> The water-based ink for ink-jet printing according to any one of the aspects <1> to <12>, wherein a content of the constitutional unit derived from the monomer (a) in the whole constitutional units of the dispersant (B) is preferably not less than 3% by mass, more preferably not less than 5% by mass, even more preferably not less than 10% by mass and further even more preferably not less than 15% by mass, and is also preferably not more than 35% by mass, more preferably not more than 30% by mass, even more preferably not more than 25% by mass and further even more preferably not more than 20% by mass.

<14> The water-based ink for ink-jet printing according to any one of the aspects <1> to <13>, wherein a content of the constitutional unit derived from the monomer (b) in the whole constitutional units of the dispersant (B) is preferably not less than 65% by mass, more preferably not less than 70% by mass, even more preferably not less than 75% by mass and further even more preferably not less than 80% by mass, and is also preferably not more than 97% by mass, more preferably not more than 95% by mass, even more preferably not more than 90% by mass and further even more preferably not more than 85% by mass.

<15> The water-based ink for ink-jet printing according to any one of the aspects <1> to <14>, wherein an acid value of the dispersant (B) is preferably not less than 110 mgKOH/g, more preferably not less than 120 mgKOH/g, even more preferably not less than 150 mgKOH/g, further even more preferably not less than 180 mgKOH/g and still further even more preferably not less than 200 mgKOH/g, and is also preferably not more than 350 mgKOH/g, more preferably not more than 300 mgKOH/g and even more preferably not more than 280 mgKOH/g.

<16> The water-based ink for ink-jet printing according to any one of the aspects <1> to <15>, wherein a weight-average molecular weight of the dispersant (B) as measured in terms of a polystyrene is preferably not less than 5,000, more preferably not less than 20,000 and even more preferably not less than 40,000, and is also preferably not more than 500,000, more preferably not more than 300,000, even more preferably not more than 150,000, further even more preferably not more than 100,000 and still further even more preferably not more than 70,000.

<17> The water-based ink for ink-jet printing according to any one of the aspects <1> to <16>, wherein the titanium oxide (A) and the dispersant (B) are present in the form of a titanium oxide dispersion (P) in the water-based ink.

<18> The water-based ink for ink-jet printing according to the aspect <17>, wherein a content of the titanium oxide (A) in the titanium oxide dispersion (P) is preferably not less than 10% by mass, more preferably not less than 20% by mass and even more preferably not less than 25% by mass, and is also preferably not more than 80% by mass, more preferably not more than 70% by mass, even more preferably not more than 60% by mass and further even more preferably not more than 50% by mass.

<19> The water-based ink for ink-jet printing according to the aspect <17> or <18>, wherein a content of the dispersant (B) in the titanium oxide dispersion (P) is preferably not less than 0.3 part by mass, more preferably not less than 0.5 part by mass, even more preferably not less than 1.0 part by mass and further even more preferably not less than 1.5 parts by mass, and is also preferably not more than 18 parts by mass, more preferably not more than 10 parts by mass, even more preferably not more than 5 parts by mass and further even more preferably not more than 3 parts by mass, on the basis of 100 parts by mass of the titanium oxide (A).

<20> The water-based ink for ink-jet printing according to any one of the aspects <1> to <19>, wherein a content of the titanium oxide (A) in the water-based ink is preferably not less than 1.0% by mass, more preferably not less than 3.0% by mass and even more preferably not less than 5.0% by mass, and is also preferably not more than 20% by mass, more preferably not more than 17% by mass and even more preferably not more than 15% by mass.

<21> The water-based ink for ink-jet printing according to any one of the aspects <1> to <20>, wherein a content of the dispersant (B) in the water-based ink is not less than 0.3 part by mass, preferably not less than 0.5 part by mass, more preferably not less than 1.0 part by mass and even more preferably not less than 1.5 parts by mass, and is also not more than 18 parts by mass, preferably not more than 10 parts by mass, more preferably not more than 5 parts by mass and even more preferably not more than 3 parts by mass, on the basis of 100 parts by mass of the titanium oxide (A).

<22> The water-based ink for ink-jet printing according to any one of the aspects <1> to <21>, further containing at least one organic solvent (C) having a boiling point of not lower than 90° C.

<23> The water-based ink for ink-jet printing according to the aspect <22>, wherein a boiling point of the organic solvent (C) is preferably not lower than 100° C., more preferably not lower than 120° C., even more preferably not lower than 150° C., further even more preferably not lower than 160° C., still further even more preferably not lower than 170° C. and still further even more preferably not lower than 180° C., and is also preferably not higher than 300° C., more preferably not higher than 290° C., even more preferably not higher than 280° C. and further even more preferably not higher than 250° C.

<24> The water-based ink for ink-jet printing according to the aspect <22> or <23>, wherein a content of the organic solvent (C) in the water-based ink is preferably not less than 5% by mass, more preferably not less than 10% by mass and even more preferably not less than 15% by mass, and is also preferably not more than 35% by mass, more preferably not more than 30% by mass and even more preferably not more than 25% by mass.

<25> The water-based ink for ink-jet printing according to any one of the aspects <1> to <24>, further containing a surfactant (D).

<26> The water-based ink for ink-jet printing according to the aspect <25>, wherein a content of the surfactant (D) in the water-based ink is preferably not less than 0.01% by mass, more preferably not less than 0.03% by mass, even more preferably not less than 0.05% by mass and further even more preferably not less than 0.07% by mass, and is also preferably not more than 5.0% by mass, more preferably not more than 3.0% by mass, even more preferably not more than 1.0% by mass and further even more preferably not more than 0.5% by mass.

<27> The water-based ink for ink-jet printing according to any one of the aspects <1> to <26>, wherein a viscosity of the water-based ink as measured at 20° C. is preferably not less than 2.0 mPa·s, more preferably not less than 3.0 mPa·s and even more preferably not less than 3.5 mPa·s, and is also preferably not more than 12 mPa·s, more preferably not more than 9.0 mPa·s, even more preferably not more than 7.0 mPa·s, further even more preferably not more than 5.5 mPa·s and still further even more preferably not more than 4.5 mPa·s.

<28> The water-based ink for ink-jet printing according to any one of the aspects <1> to <27>, wherein a pH value of the water-based ink as measured at 20° C. is preferably not less than 5.5, more preferably not less than 6.0 and even more preferably not less than 6.5, and is also preferably not more than 11.0, more preferably not more than 10.0, even more preferably not more than 9.5 and further even more preferably not more than 9.0.

<29> A use of the water-based ink for ink-jet printing according to any one of the aspects <1> to <28> in an ink-jet printing method.

<30> The use of the water-based ink for ink-jet printing in an ink-jet printing method according to the aspect <29>, wherein the ink-jet printing method is a method of ejecting the water-based ink onto a printing medium using an ink-jet printing apparatus to print characters or images on the printing medium, and the ink-jet printing apparatus is equipped with a dispersing means for dispersing the titanium oxide (A) in the water-based ink.

<31> An ink-jet printing method of ejecting the water-based ink according to any one of the aspects <1> to <28> onto a printing medium using an ink-jet printing apparatus to print characters or images on the printing medium in which the ink-jet printing apparatus is equipped with a dispersing means for dispersing the titanium oxide (A) in the water-based ink, said method including the following steps 1 and 2:

Step 1: redispersing the water-based ink by the dispersing means; and

Step 2: ejecting the water-based ink redispersed in the step 1 onto the printing medium to print characters or images on the printing medium.

EXAMPLES

In the following Production Examples, Examples and Comparative Examples, the "part(s)" and "%" indicate "part(s) by mass" and "% by mass", respectively, unless otherwise specified.

(1) Measurement of Weight-Average Molecular Weight of Pigment Dispersant (B)

The weight-average molecular weight of the pigment dispersant (B) was measured by gel permeation chromatography [GPC apparatus: "HLC-8320GPC" available from Tosoh Corporation; columns: "PW"+"G4000PW"+"G2500PW" available from Tosoh Corporation; flow rate: 1.0 mL/min; temperature: 40° C.] using a 0.2 M phosphoric acid buffer/acetonitrile solution (volume ratio of phosphoric acid buffer/acetonitrile: 9/1) as an eluent, and using a polyethylene glycol having a previously determined monodisperse weight-average molecular weight as a reference standard substance.

(2) Measurement of Acid Value of Pigment Dispersant (B)

The acid value of the pigment dispersant (B) was measured according to potentiometric titration method prescribed in JIS K 0070.

(3) Measurement of Solid Content

Ten grams (10.0 g) of sodium sulfate dried to constant weight in a desiccator were weighed and charged in a 30 mL polypropylene vessel (φ: 40 mm; height: 30 mm), and about 1.0 g of a sample was added to the vessel. The contents of the vessel were mixed and then accurately weighed. The resulting mixture was maintained in the vessel at 105° C. for 2 hours to remove volatile components therefrom, and allowed to stand in a desiccator for 15 minutes to measure a mass thereof. The mass of the sample after removing the volatile components therefrom was regarded as a mass of solids therein. The solid content (%) of the sample was calculated by dividing the mass of the solids by the mass of the sample initially added.

(4) Measurement of Average Primary Particle Size of Titanium Oxide

The average primary particle size of titanium oxide was determined by the following method. That is, using a transmission electron microscope "JEM-2100" available form JEOL Ltd., 500 primary particles of the titanium oxide were extracted by image analysis to measure their particle sizes and calculate an average value of the thus measured particles sizes as a number-average particle size thereof. Meanwhile, in the case where the respective titanium oxide particles had a major axis diameter and a minor axis diameter, the average primary particle size of the titanium oxide was calculated by using the major axis diameters thereof.

(5) pH of Ink

The pH value of the ink was measured at 20° C. using a bench-top pH meter "F-71" available from Horiba Ltd., equipped with a pH electrode "6337-10D" available from Horiba Ltd.

(6) Viscosity of Ink

The viscosity of the ink was measured at 20° C. using an E-type viscometer "TV-25" (equipped with a standard cone rotor (1°34'×R24); rotating speed: 50 rpm) available from Toki Sangyo Co., Ltd.

Production of Pigment Dispersant

Production Example 1-1

Two hundred thirty three grams (233 g) of water were charged into a 2 L glass reaction vessel equipped with a dropping funnel, and heated to 80° C. in a nitrogen atmosphere.

Next, in a nitrogen atmosphere, three solutions, i.e., a monomer solution containing 164 g of methoxy polyethylene glycol monomethacrylate "NK ESTER M-230G" (tradename; average molar number of addition of ethyleneoxide (EO): n=23) as a dropping solution 1 available from Shin-Nakamura Chemical Co., Ltd., and 34 g of methacrylic acid, 27 g of a 7% 2-mercaptoethanol aqueous solution as a dropping solution 2, and 32 g of a 6% ammonium persulfate aqueous solution as a dropping solution 3, were respectively added dropwise at the same time into the reaction vessel over 90 minutes.

Next, 11 g of a 6% ammonium persulfate aqueous solution was gradually added dropwise into the reaction vessel over 30 minutes. After completion of the dropwise addition, the resulting mixed solution was aged at 80° C. for 1 hour.

Thereafter, the resulting reaction solution was cooed to 40° C., and then 13 g of a 48% sodium hydroxide aqueous solution was added thereto to neutralize the solution. Then, water was added to resulting reaction mixture to adjust a solid content thereof to 40%, thereby obtaining a solution of a dispersant B-1.

Production Examples 1-2 to 1-9 and Comparative Production Examples 1-1 to 1-6

The same procedure as in Production Example 1-1 was repeated except that the kind and amount of monomers used were replaced with those shown in Table 1, thereby obtaining solutions of dispersants B-2 to B-9 and BC-1 to BC-6.

Meanwhile, the details of the monomers shown in Table 1 are as follows.

MPEGMAA (n=23): Methoxy polyethylene glycol monomethacrylate "NK ESTER M-230G" (tradename; average molar number of addition of EO=23) available from Shin-Nakamura Chemical Co., Ltd.

MPEGMAA (n=45): Methoxy polyethylene glycol monomethacrylate "NK ESTER M-450G" (tradename; average molar number of addition of EO=45) available from Shin-Nakamura Chemical Co., Ltd.

MPEGMAA (n=90): Methoxy polyethylene glycol monomethacrylate "NK ESTER M-900G" (tradename; average molar number of addition of EO=90) available from Shin-Nakamura Chemical Co., Ltd.

MPEGMAA (n=9): Methoxy polyethylene glycol monomethacrylate "NK ESTER M-90G" (tradename; average molar number of addition of EO=9) available from Shin-Nakamura Chemical Co., Ltd.

50POEP-800B (n=14): Octoxy polyethylene glycol/polypropylene glycol methacrylate (block type) "BLEMMER 50POEP-800B" (tradename; average molar number of addition of EO=8; average molar number of addition of propyleneoxide (PO)=6) available from NOF Corporation MPEGMAA (n=120): Methoxy polyethylene glycol monomethacrylate (average molar number of addition of EO=120; the reaction product produced in the following Production Example 1 was used as the MPEGMAA (n=120)).

Production Example 1 (Production of Methoxy Polyethylene Glycol Monomethacrylate (n=120))

Using polyethylene glycol monomethyl ether (average molar number of addition of EO: 120; weight-average molecular weight: 5312) melted at 80° C., the method described in Example 1 of JP 11-228636A was conducted, thereby obtaining methoxy polyethylene glycol monomethacrylate (average molar number of addition of EO: 120) as the aimed product.

TABLE 1

| | | Production Examples | | | | | | | | |
|---|---|---|---|---|---|---|---|---|---|---|
| | | 1-1 | 1-2 | 1-3 | 1-4 | 1-5 | 1-6 | 1-7 | 1-8 | 1-9 |
| Anionic group-containing monomer (a) (%)*[1] | Methacrylic acid | 17 | 17 | 17 | 32 | 41 | 60 | | | |
| | Acrylic acid | | | | | | | 15 | 17 | 49 |
| Polyalkylene glycol (meth)acrylate (b) (%)*[1] | MPEGMAA (n = 23) | 83 | | | 68 | 59 | 40 | 85 | 83 | 51 |
| | MPEGMAA (n = 45) | | 83 | | | | | | | |
| | MPEGMAA (n = 90) | | | 83 | | | | | | |
| | MPEGMAA (n = 9) | | | | | | | | | |
| | 50POEP-800B (n = 14) | | | | | | | | | |
| | MPEGMAA (n = 120) | | | | | | | | | |
| Acid value (mgKOH/g) | | 113 | 113 | 113 | 208 | 267 | 388 | 115 | 131 | 381 |
| Weight-average molecular weight | | 51000 | 60000 | 68000 | 48000 | 55000 | 60000 | 58000 | 51000 | 49000 |
| Kind of pigment dispersant (B) | | B-1 | B-2 | B-3 | B-4 | B-5 | B-6 | B-7 | B-8 | B-9 |

| | | Comparative Production Examples | | | | | |
|---|---|---|---|---|---|---|---|
| | | 1-1 | 1-2 | 1-3 | 1-4 | 1-5 | 1-6 |
| Anionic group-containing monomer (a) (%)*[1] | Methacrylic acid | 17 | 17 | 17 | 9 | 13 | 100 |
| | Acrylic acid | | | | | | |
| Polyalkylene glycol (meth)acrylate (b) (%)*[1] | MPEGMAA (n = 23) | | | | 91 | 87 | |
| | MPEGMAA (n = 45) | | | | | | |
| | MPEGMAA (n = 90) | | | | | | |
| | MPEGMAA (n = 9) | 83 | | | | | |
| | 50POEP-800B (n = 14) | | 83 | | | | |
| | MPEGMAA (n = 120) | | | 83 | | | |
| Acid value (mgKOH/g) | | 113 | 113 | 113 | 56 | 82 | 652 |
| Weight-average molecular weight | | 59000 | 62000 | 68000 | 56000 | 52000 | 50000 |
| Kind of pigment dispersant (B) | | BC-1 | BC-2 | BC-3 | BC-4 | BC-5 | BC-6 |

Note
*[1]Contents of respective monomers in monomer mixture.

Production of Titanium Oxide Dispersion

Production Example 2-1

A 250 mL polyethylene bottle was charged with 0.188 g of the dispersant (B-1) solution (solid content: 40%) produced in Production Example 1-1 (active ingredient of dispersant B-1: 0.075 g), 15 g of titanium oxide A-1 and 15.3 g of water. Then, 369 g of zirconia beads were added to the bottle, and the contents of the bottle were dispersed at 25° C. for 8 hours using a bench-type pot mill pedestal available from AS ONE Corporation. The resulting dispersion was filtered through a mesh filter to remove the zirconia beads from the resulting dispersion, and then water was added to the dispersion to adjust a solid content thereof, thereby obtaining a titanium oxide dispersion P-1 (solid content: 30% by mass).

Production Example 2-2 to 2-15 and Comparative Production Example 2-1 to 2-8 (Production of Titanium Oxide Dispersions)

The same procedure as in Production Example 2-1 was repeated except that the kinds and amounts of the pigment dispersant and titanium oxide used were replaced with those shown in Table 2, thereby obtaining titanium oxide dispersions P-2 to P-15 and PC-1 to PC-8 (solid content: 30% by mass).

Meanwhile, the details of the titanium oxides used in the aforementioned Production Examples and Comparative Production Examples are as follows.

A-1: Rutile type titanium oxide surface-treated with alumina, silica and zinc oxide; average primary particle size: 270 nm; available from TAYCA Corporation.

A-2: Rutile type titanium oxide surface-treated with alumina and silica; average primary particle size: 35 nm; available from TAYCA Corporation.

A-3: Rutile type titanium oxide surface-treated with alumina and zirconia; average primary particle size: 50 nm; available from TAYCA Corporation.

TABLE 2

| | | Titanium oxide dispersion (P) Kind | Titanium oxide (A) Kind | Average primary particle size (nm) | Pigment dispersant (B) Kind | Average molar number of addition n*² | Acid value (mgKOH/g) | Amount added (g)*¹ |
|---|---|---|---|---|---|---|---|---|
| Production Examples | 2-1 | P-1 | A-1 | 270 | B-1 | 23 | 113 | 0.5 |
| | 2-2 | P-2 | A-1 | 270 | B-1 | 23 | 113 | 1 |
| | 2-3 | P-3 | A-1 | 270 | B-1 | 23 | 113 | 2 |
| | 2-4 | P-4 | A-1 | 270 | B-1 | 23 | 113 | 5 |
| | 2-5 | P-5 | A-1 | 270 | B-1 | 23 | 113 | 10 |
| | 2-6 | P-6 | A-1 | 270 | B-2 | 45 | 113 | 2 |
| | 2-7 | P-7 | A-1 | 270 | B-3 | 90 | 113 | 2 |
| | 2-8 | P-8 | A-1 | 270 | B-4 | 23 | 208 | 2 |
| | 2-9 | P-9 | A-1 | 270 | B-5 | 23 | 267 | 2 |
| | 2-10 | P-10 | A-1 | 270 | B-6 | 23 | 388 | 2 |
| | 2-11 | P-11 | A-1 | 270 | B-7 | 23 | 115 | 2 |
| | 2-12 | P-12 | A-1 | 270 | B-8 | 23 | 131 | 2 |
| | 2-13 | P-13 | A-1 | 270 | B-9 | 23 | 381 | 2 |
| | 2-14 | P-14 | A-2 | 30 | B-1 | 23 | 113 | 2 |
| | 2-15 | P-15 | A-3 | 50 | B-1 | 23 | 113 | 2 |
| Comparative Production Examples | 2-1 | PC-1 | A-1 | 270 | B-1 | 23 | 113 | 0.25 |
| | 2-2 | PC-2 | A-1 | 270 | B-1 | 23 | 113 | 20 |
| | 2-3 | PC-3 | A-1 | 270 | BC-1 | 9 | 113 | 2 |
| | 2-4 | PC-4 | A-1 | 270 | BC-2 | 14 | 113 | 2 |
| | 2-5 | PC-5 | A-1 | 270 | BC-3 | 120 | 113 | 2 |
| | 2-6 | PC-6 | A-1 | 270 | BC-4 | 23 | 56 | 2 |
| | 2-7 | PC-7 | A-1 | 270 | BC-5 | 23 | 82 | 2 |
| | 2-8 | PC-8 | A-1 | 270 | BC-6 | — | 652 | 2 |

Note
*¹Amount of pigment dispersant added on the basis of 100 parts by mass of titanium oxide.
*²Average molar number (n) of addition of alkyleneoxide in polyalkylene glycol (meth)acrylate (b) constituting pigment dispersant (B).

Production of Water-Based Ink

Example 1

The water-based ink 1 was produced by using the titanium oxide dispersion P-1 (solid content: 30% by mass). That is, respective components of the following composition were mixed with each other such that contents of the titanium oxide and the pigment dispersant in the resulting ink were 10% by mass and 0.05% by mass, respectively. The resulting mixed solution was subjected to filtration through a 25 mL-capacity needleless syringe fitted with a 1.2 μm-mesh filter (acetyl cellulose membrane; outer diameter; 2.5 cm) available from FUJIFILM Corporation to remove coarse particles therefrom, thereby obtaining the water-based ink 1. It was confirmed that the viscosity of the resulting water-based ink 1 was 3.8 mPa·s as measured at 20° C., and the pH value of the water-based ink 1 was 7.0 as measured at 20° C.
<Composition>

| | |
|---|---|
| Titanium oxide dispersion P-1 (containing 10 parts of the titanium oxide and 0.05 part of the pigment dispersant) | 33.5 parts |
| 1,2-Hexanediol (boiling point (b.p.): 223° C.) | 2.0 parts |
| Glycerin (b.p.: 290° C.) | 17 parts |
| 2-Pyrrolidone (b.p.: 245° C.) | 2.0 parts |
| Triethanolamine (b.p.: 208° C.) | 1.0 part |
| Triethylene glycol monobutyl ether (b.p.: 276° C.) | 1.0 part |
| "SURFYNOL 104PG-50" (a propylene glycol (b.p.: 188° C.) solution of an acetylene glycol-based surfactant; active ingredient content: 50%) available from Nissin Chemical Industry Co., Ltd. | 0.2 part |
| "OLEFIN E1010" (a wetting agent; an ethyleneoxide (10 mol) adduct of acetylenediol) available from Nissin Chemical Industry Co., Ltd. | 0.6 part |
| Ion-exchanged water | 42.7 parts |

Examples 2 to 15 and Comparative Examples 1 to 8

The same procedure as in Example 1 was repeated except that the titanium oxide dispersion P-1 was replaced with each of the titanium oxide dispersions P-2 to P-15 and the titanium oxide dispersions PC-1 to PC-8; and the amounts of the respective titanium oxide dispersions used were controlled such that the content of the titanium oxide in the resulting ink was 10% by mass, and the amount of water as the balance was adjusted correspondingly, thereby obtaining water-based inks.

Meanwhile, it was confirmed that the resulting water-based inks 2 to 15 obtained in Examples 2 to 15, respectively, had a viscosity in the range of 3.8 to 4.2 mPa·s as measured at 20° C. and also had a pH value in the range of 6.5 to 8.5 as measured at 20° C.

The respective water-based inks obtained in Examples 1 to 15 were filled into an ink container of a commercially available ink-jet printing apparatus equipped with a dispersing means. After conducting the printing, the operation of the ink-jet printing apparatus was interrupted at room temperature for a predetermined period of time. Next, the water-based ink in the ink container was redispersed by the dispersing means and then ejected onto a commercially available OHP film. As a result, it was confirmed that good printed materials could be obtained without occurrence of clogging of nozzles.

<Evaluation of Redispersibility and Whiteness of Water-Based Ink>

The respective water-based inks obtained above were evaluated with respect to redispersibility and whiteness by the following methods. The results are shown in Tables 3 to 6.

(1) Evaluation of Redispersibility

Six grams (6 g) of the respective water-based inks obtained above were charged into a 10 mL screw vial and allowed to stand therein at 70° C. for 7 days. Thereafter, the screw vial was laid down horizontally, and shaken by a multi-shaker "MMS-210" available from Tokyo Rikakikai Co., Ltd., at 150 rpm for 15 seconds. Immediately after the shaking, 2 g of the water-based ink in the screw vial was sampled from a liquid level thereof using a pipette. The shaking conditions used above were determined assuming that the dispersing means of the ink-jet printing apparatus was operated.

Then, 0.3 g of the thus sampled water-based ink was diluted 2500 times with distilled water. Next, the diluted sample was subjected to the measurement of an absorbance (Abs value) thereof at a wavelength of 500 nm using a spectrophotometer "U-3010" available from Hitachi High-Tech Science Corporation. From the absorbance values of the samples obtained by diluting the respective water-based inks immediately after production thereof 2500 times with distilled water, the redispersion rate of the water-based ink was calculated according to the following formula.

Redispersion rate (%)=100×[(absorbance of a supernatant solution obtained after allowing the water-based ink to stand at 70° C. for 7 days and then shaking the water-based ink)/(absorbance of the water-based ink immediately after production thereof)]

On the basis of the thus calculated redispersion rate, the redispersibility of the water-based ink was evaluated according to the following evaluation ratings. The larger the redispersion rate becomes, the more excellent the redispersibility of the water-based ink is.

A: Redispersion rate was not less than 90% and not more than 100%.
B: Redispersion rate was not less than 80% and less than 90%.
C: Redispersion rate was less than 80%.

(2) Evaluation of Whiteness

Using an ink-jet printing apparatus (product number: "EM-930C"; piezoelectric type) commercially available from Seiko Epson Corporation, the respective water-based inks obtained above were ejected onto an OHP film (for ink-jet printing) available from A-One Co., Ltd., to conduct solid image printing thereon. The OHP film thus subjected to the solid image printing was placed on a black-colored portion of a hiding power chart (JIS accepted product) available from Taiyu Kizai Co., Ltd., such that the printed surface of the OHP film faced upward, and the L value of the solid image printed thereon was measured from above using a spectrophotometer "SpectroEye" available from Gretag Macbeth GmbH to thereby evaluate a whiteness of the respective water-based inks according to the following evaluation ratings. The respective water-based inks were used in such a condition that the water-based ink obtained immediately after production thereof was shaken to well disperse the titanium oxide in the ink. If the whiteness of the water-based ink according to the following evaluation ratings is B or higher rank, the ink can be suitably used in practical applications.

A: L value was not less than 60.
B: L value was less than 60.

TABLE 3

| | Titanium oxide (A) | | Pigment dispersant (B) | | | | Redispersibility | | |
|---|---|---|---|---|---|---|---|---|---|
| | Kind | Average primary particle size (nm) | Kind | Anionic group-containing monomer (a) | Polyalkylene glycol (meth)acrylate (b) | Acid value (mgKOH/g) | Content (part(s))*1 | Redispersion rate (%) | Evaluation | Whiteness Evaluation |
| Example 1 | A-1 | 270 | B-1 | Methacrylic acid | MPEGMAA (n = 23) | 113 | 0.5 | 80 | B | A |
| Example 2 | A-1 | 270 | B-1 | Methacrylic acid | MPEGMAA (n = 23) | 113 | 1 | 86 | B | A |
| Example 3 | A-1 | 270 | B-1 | Methacrylic acid | MPEGMAA (n = 23) | 113 | 2 | 93 | A | A |
| Example 4 | A-1 | 270 | B-1 | Methacrylic acid | MPEGMAA (n = 23) | 113 | 5 | 90 | A | A |
| Example 5 | A-1 | 270 | B-1 | Methacrylic acid | MPEGMAA (n = 23) | 113 | 10 | 84 | B | A |
| Comparative Example 1 | A-1 | 270 | B-1 | Methacrylic acid | MPEGMAA (n = 23) | 113 | 0.25 | 70 | C | A |
| Comparative Example 2 | A-1 | 270 | B-1 | Methacrylic acid | MPEGMAA (n = 23) | 113 | 20 | 65 | C | A |

Note
*1 Content of pigment dispersant on the basis of 100 parts by mass of titanium oxide.

TABLE 4

| | Titanium oxide (A) | | Pigment dispersant (B) | | | | Redispersibility | | |
|---|---|---|---|---|---|---|---|---|---|
| | Kind | Average primary particle size (nm) | Kind | Anionic group-containing monomer (a) | Polyalkylene glycol (meth)acrylate (b) | Acid value (mgKOH/g) | Content (part(s))*1 | Redispersion rate (%) | Evaluation | Whiteness Evaluation |
| Example 3 | A-1 | 270 | B-1 | Methacrylic acid | MPEGMAA (n = 23) | 113 | 2 | 93 | A | A |
| Example 6 | A-1 | 270 | B-2 | Methacrylic acid | MPEGMAA (n = 45) | 113 | 2 | 90 | A | A |
| Example 7 | A-1 | 270 | B-3 | Methacrylic acid | MPEGMAA (n = 90) | 113 | 2 | 80 | B | A |
| Comparative Example 3 | A-1 | 270 | BC-1 | Methacrylic acid | MPEGMAA (n = 9) | 113 | 2 | 10 | C | A |
| Comparative Example 4 | A-1 | 270 | BC-2 | Methacrylic acid | 50POEP-800B (n = 14) | 113 | 2 | 78 | C | A |
| Comparative Example 5 | A-1 | 270 | BC-3 | Methacrylic acid | MPEGMAA (n = 120) | 113 | 2 | 70 | C | A |

Note
*1 Content of pigment dispersant on the basis of 100 parts by mass of titanium oxide.

TABLE 5

| | Titanium oxide (A) | | Pigment dispersant (B) | | | | Redispersibility | | |
|---|---|---|---|---|---|---|---|---|---|
| | Kind | Average primary particle size (nm) | Kind | Anionic group-containing monomer (a) | Polyalkylene glycol (meth)acrylate (b) | Acid value (mgKOH/g) | Content (part(s))*1 | Redispersion rate (%) | Evaluation | Whiteness Evaluation |
| Example 3 | A-1 | 270 | B-1 | Methacrylic acid | MPEGMAA (n = 23) | 113 | 2 | 93 | A | A |
| Example 8 | A-1 | 270 | B-4 | Methacrylic acid | MPEGMAA (n = 23) | 208 | 2 | 95 | A | A |
| Example 9 | A-1 | 270 | B-5 | Methacrylic acid | MPEGMAA (n = 23) | 267 | 2 | 94 | A | A |
| Example 10 | A-1 | 270 | B-6 | Methacrylic acid | MPEGMAA (n = 23) | 388 | 2 | 92 | A | A |
| Example 11 | A-1 | 270 | B-7 | Acrylic acid | MPEGMAA (n = 23) | 115 | 2 | 86 | B | A |
| Example 12 | A-1 | 270 | B-8 | Acrylic acid | MPEGMAA (n = 23) | 131 | 2 | 91 | A | A |
| Example 13 | A-1 | 270 | B-9 | Acrylic acid | MPEGMAA (n = 23) | 381 | 2 | 89 | B | A |
| Comparative Example 6 | A-1 | 270 | BC-4 | Methacrylic acid | MPEGMAA (n = 23) | 56 | 2 | 41 | C | A |
| Comparative Example 7 | A-1 | 270 | BC-5 | Methacrylic acid | MPEGMAA (n = 23) | 82 | 2 | 70 | C | A |
| Comparative Example 8 | A-1 | 270 | BC-6 | Methacrylic acid | — | 652 | 2 | 78 | C | A |

Note
*1 Content of pigment dispersant on the basis of 100 parts by mass of titanium oxide.

TABLE 6

| | Titanium oxide (A) | | Pigment dispersant (B) | | | | Redispersibility | | |
|---|---|---|---|---|---|---|---|---|---|
| | Kind | Average primary particle size (nm) | Kind | Anionic group-containing monomer (a) | Polyalkylene glycol (meth)acrylate (b) | Acid value (mgKOH/g) | Content (part(s))*1 | Redispersion rate (%) | Evaluation | Whiteness Evaluation |
| Example 3 | A-1 | 270 | B-1 | Methacrylic acid | MPEGMAA (n = 23) | 113 | 2 | 93 | A | A |

TABLE 6-continued

|  | Titanium oxide (A) | | Pigment dispersant (B) | | | | | Redispersibility | | |
|---|---|---|---|---|---|---|---|---|---|---|
|  | Kind | Average primary particle size (nm) | Kind | Anionic group-containing monomer (a) | Polyalkylene glycol (meth)acrylate (b) | Acid value (mgKOH/g) | Content (part(s))*1 | Redispersion rate (%) | Evaluation | Whiteness Evaluation |
| Example 14 | A-2 | 35 | B-1 | Methacrylic acid | MPEGMAA (n = 23) | 113 | 2 | 97 | A | B |
| Example 15 | A-3 | 50 | B-1 | Methacrylic acid | MPEGMAA (n = 23) | 113 | 2 | 95 | A | B |

Note
*1Content of pigment dispersant on the basis of 100 parts by mass of titanium oxide.

From Table 3, it was confirmed that the water-based inks obtained in Examples 1 to 5 in which the content of the dispersion (B) in the ink was not less than 0.3 part by mass and not more than 18 parts by mass on the basis of 100 parts by mass of the titanium oxide (A) were excellent in redispersibility and whiteness as compared to the water-based inks obtained in Comparative Examples 1 and 2.

From Table 4, it was confirmed that the water-based inks obtained in Examples 3, 6 and 7 in which the average molar number (n) of addition of an alkyleneoxide in the polyalkylene glycol (meth)acrylate (b) constituting the dispersant (B) was not less than 15 and not more than 100 were excellent in redispersibility and whiteness as compared to the water-based inks obtained in Comparative Examples 3 to 5.

From Table 5, it was confirmed that the water-based inks obtained in Examples 3 and 8 to 13 in which the acid value of the dispersant (B) was not less than 100 mgKOH/g and not more than 400 mgKOH/g were excellent in redispersibility and whiteness as compared to the water-based inks obtained in Comparative Examples 6 to 8.

From Table 6, it was confirmed that the water-based inks obtained in Examples 3, 14 and 15 were excellent in redispersibility even though the average primary particle size of the titanium oxide (A) contained therein was small. Therefore, it was confirmed that by using the pigment dispersant (B) according to the present invention, it was possible to obtain the water-based ink having good redispersibility even though the titanium oxide used therein had a small average primary particle size.

INDUSTRIAL APPLICABILITY

The water-based ink of the present invention is excellent in redispersibility and therefore can be suitably used as a water-based ink for ink-jet printing.

REFERENCE SIGNS LIST

1: Ink ejection means
2: Ink container
3: Ink flow path
4: Stirring mechanism
5: Printing medium

The invention claimed is:

1. A water-based ink for ink-jet printing, wherein the water-based ink comprises titanium oxide (A) and a pigment dispersant (B), in which:
the pigment dispersant (B) comprises a constitutional unit derived from an anionic group-containing monomer (a) and a constitutional unit derived from a polyalkylene glycol (meth)acrylate (b);
an average molar number of addition of an alkyleneoxide in the polyalkylene glycol (meth)acrylate (b) is not less than 15 and not more than 100;
an acid value of the pigment dispersant (B) is not less than 100 mgKOH/g and not more than 400 mgKOH/g; and
a content of the pigment dispersant (B) in the water-based ink is not less than 0.3 parts by mass and not more than 18 parts by mass on the basis of 100 parts by mass of the titanium oxide (A),
wherein a content of the constitutional unit derived from the polyalkylene glycol (meth)acrylate (b) in whole constitutional units of the pigment dispersant (B) is not less than 65% by mass and not more than 97% by mass.

2. The water-based ink for ink-jet printing according to claim 1, wherein an average primary particle size of the titanium oxide (A) is not less than 100 nm and not more than 500 nm.

3. The water-based ink for ink-jet printing according to claim 1, wherein the anionic group-containing monomer (a) is at least one compound selected from the group consisting of acrylic acid and methacrylic acid.

4. The water-based ink for ink-jet printing according to claim 1, wherein a content of the titanium oxide (A) in the water-based ink is not less than 1.0% by mass and not more than 20% by mass.

5. The water-based ink for ink-jet printing according to claim 1, wherein the alkyleneoxide is ethyleneoxide.

6. The water-based ink for ink-jet printing according to claim 1, wherein the average molar number of addition of the alkyleneoxide in the polyalkylene glycol (meth)acrylate (b) is not less than 15 and not more than 90.

7. The water-based ink for ink-jet printing according to claim 1, wherein the constitutional unit derived from the polyalkylene glycol (meth)acrylate (b) is a constitutional unit derived from a polyalkylene glycol (meth)acrylate (b-1) represented by the following formula (1):

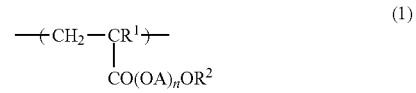

(1)

wherein $R^1$ is a hydrogen atom or a methyl group; $R^2$ is a hydrogen atom or an alkyl group having not less than 1 and not more than 20 carbon atoms; OA is an oxyalkylene group having not less than 2 and not more than 4 carbon atoms; and n represents an average molar number of addition of an alkyleneoxide, and is a number of not less than 15 and not more than 100.

8. The water-based ink for ink-jet printing according to claim 7, wherein in the general formula (1), OA as the oxyalkylene group is an oxyethylene group.

9. The water-based ink for ink-jet printing according to claim 7, wherein in the general formula (1), $R^2$ is a hydrogen atom or an alkyl group having not less than 1 and not more than 8 carbon atoms.

10. The water-based ink for ink-jet printing according to claim 1, wherein a content of the constitutional unit derived from the monomer (a) in whole constitutional units of the pigment dispersant (B) is not less than 3% by mass and not more than 35% by mass.

11. The water-based ink for ink-jet printing according to claim 1, wherein a weight-average molecular weight of the pigment dispersant (B) in terms of a polystyrene is not less than 5,000 and not more than 500,000.

12. The water-based ink for ink-jet printing according to claim 1, further comprising at least one organic solvent (C) having a boiling point of not lower than 90° C.

13. The water-based ink for ink-jet printing according to claim 1, wherein the titanium oxide (A) is a titanium oxide surface-treated with an inorganic substance.

14. The water-based ink for ink-jet printing according to claim 1, wherein an anionic group of the anionic group-containing monomer (a) is a carboxy group.

15. The water-based ink for ink-jet printing according to claim 1, wherein the titanium oxide (A) and the pigment dispersant (B) are present in the form of a titanium oxide dispersion (P) in the water-based ink.

16. The water-based ink for ink-jet printing according to claim 1, wherein the content of water in the water-based ink is not less than 40% by mass and not more than 80% by mass.

17. The water-based ink for ink-jet printing according to claim 12, wherein a content of the organic solvent (C) in the water-based ink is not less than 5% by mass and not more than 35% by mass.

18. The water-based ink for ink-jet printing according to claim 1, further comprising a surfactant (D).

* * * * *